United States Patent [19]

Rivera et al.

[11] Patent Number: 4,998,613

[45] Date of Patent: Mar. 12, 1991

[54] SELF ADJUSTABLE ESCALATOR HANDRAIL DRIVE

[75] Inventors: James A. Rivera, Bristol; Gerald E. Johnson, Farmington, both of Conn.

[73] Assignee: Otis Elevator Company, Farmington, Conn.

[21] Appl. No.: 445,226

[22] Filed: Dec. 4, 1989

[51] Int. Cl.[5] .............................................. B65G 15/00

[52] U.S. Cl. .................................................... 198/335

[58] Field of Search ................ 198/330, 331, 335, 835

[56] References Cited

FOREIGN PATENT DOCUMENTS 0015285 2/1979 Japan .................................. 198/331

0120174 9/1979 Japan .................................. 198/335

*Primary Examiner*—Robert P. Olszewski

*Assistant Examiner*—James R. Bidwell

*Attorney, Agent, or Firm*—William W. Jones

[57] ABSTRACT

The handrail drive is a mangle-type drive wherein the handrail passes through the nip of a pair of opposed drive rollers. A plurality of drive roller pairs may be used. The drive rollers are keyed to rotatable shafts to which drive sprockets are also keyed. The drive sprockets are rotated by an endless chain which in turn is driven by one or more powered sprockets. The drive roller shafts are journaled in rotatable bearings which are mounted in a mechanism housing with the bearings being eccentrically mounted in the housing with respect to the drive roller shafts. The housing is divided into two halves, each mounting one of the rollers in a drive roller pair. The two housing halves are hinged together so that the nip of each drive roller pair can be opened by pivoting one half of the housing away from the other half of the housing. When the drive rollers are rotated, friction between the handrail and the drive rollers, and between the roller shafts and eccentric bearings will cause the bearings to rotate about their axes thereby tightening the drive rollers about the handrail. As handrail drive roller friction increases, the tightening effect also increases. The rollers will only tighten on the extent needed to overcome the friction between the handrail and its guide rail. When the drive mechanism is turned off, the drive rollers only lightly engage the handrail.

4 Claims, 2 Drawing Sheets

SELF ADJUSTABLE ESCALATOR HANDRAIL DRIVE

This is a continuation-in-part of U.S. Ser. No. 07/316,629 filed February 28, 1989.

TECHNICAL FIELD

This invention relates to a handrail drive mechanism for an escalator or other similar passenger conveyor, and more particularly to a handrail drive mechanism which automatically increases the driving force in response to resistance of movement of the handrail, and which can easily be engaged and disengaged from the handrail.

BACKGROUND ART

Passenger conveyors such as escalators or horizontal moving walkways will typically include handrails which move along hand rail guides in synchronism with the tread portion of the passenger conveyor. The drive for the handrail can include driving rollers which engage the handrail, moving racks which engage the underside of the handrail, or rotating sprockets which engage the underside of the handrail. When driving rollers are used, they may be directly opposed to form a mangle-type nip through which the handrail moves, or they may be rectilinearly offset along the path of movement of the handrail. Driving rollers can include combinations of driven rollers and idler rollers which cooperate to move the handrail. Devices have been described in the prior art which will vary the driving force imposed upon the handrail by the driving rollers.

This provision is especially desirable when the driving rollers are smooth and rely on friction to provide the driving force necessary to move the handrail. U.S. Pat. Nos. 3,414,109 Clark, granted Dec. 3, 1968; 3,666,075 Iwata, granted May 30, 1972; 4,134,883 Mendelsohn et al, granted Jan. 16, 1979; 4,151,905 Takahashi et al, granted May 1, 1979; and 4,200,177 Sato et al, granted Apr. 29, 1980 are typical prior art disclosures of passenger conveyor handrail devices.

DISCLOSURE OF THE INVENTION

The handrail drive mechanism of this invention is a mangle-type mechanism wherein the handrail passes through the nip of one or more opposed pairs of driving rollers. The driving force imparted to the handrail depends on the forces generated by the squeezing of the handrail by the rollers, and on frictional forces between the rollers and the handrail. The driving rollers are keyed to rotatable shafts to which chain sprockets are also keyed. An endless chain is mounted on the chain sprockets and can be driven in either direction by a powered sprocket. The power source is a reversible electric motor, typically the same motor that drives the treads on the passenger mover. The drive mechanism is mounted in a housing in opposed walls of which are journaled pairs of mount bearings. The housing is formed from an upper component carrying the upper drive rollers, and a lower component carrying the lower drive rollers. The upper and lower housing components are hinged together so that the upper and lower rollers can be swung away from each other to disengage from the handrail in simple fashion. The ends of each driving roller and sprocket shaft are rotatably carried by a cooperating pair of the end bearings. The end bearings and the roller and sprocket shaft are eccentric, with the rotational axis of the shaft-being further away from the roller nip, and thus the handrail, than the rotational axis of the mount bearings. When the drive mechanism is idle, i.e., is not being driven, the drive chain is slightly slack, and the roller and sprocket shaft axes will remain further away from the nip, and, in each pair of cooperating driving rollers, further away from each other. Thus in the idle condition, very little or no squeezing or compression of the handrail will occur. This is a desirable condition since it enhances the useful life of the handrail.

When the drive mechanism is energized, the chain tightens as it is driven around the driving sprockets by the powered sprocket or sprockets. Rotation of the driving sprockets by the chain causes concurrent rotation of the driving rollers. Rotation of the driving roller and sprocket shafts in the eccentric bearings causes the eccentric bearings to rotate in the housing walls. This bearing rotation is slight but it brings the axes of each pair of opposed driving rollers closer to each other, and closer to the handrail. Consequently, the driving rollers are moved closer to each other whereby nip pressure on the handrail increases. So long as the handrail moves easily over its guiderail, the nip pressure generated by the opposed driving rollers will remain relatively constant. There will be just enough nip pressure to keep the handrail moving along over the handrail guide. If friction between the handrail and handrail guide increases, then the eccentric bearings will rotate further causing an increase in the nip pressure until a new state of equilibrium is reached. The reverse is true if the handrail-handrail guide friction decreases, such as when the passenger load in the mover decreases. Thus the nip pressure on the handrail constantly adjusts itself so that it remains at an equilibrium point which provides only enough driving force to overcome the frictional resistance to movement of the handrail over the handrail guide.

It is therefore an object of this invention to provide an improved passenger conveyor handrail drive which drives the handrails in synchronism with the passenger treads.

It is a further object of this invention to provide a handrail drive of the character described which drives the handrail through the nips of pairs of opposed driving rollers.

It is an additional object of this invention to provide a handrail drive of the character described wherein the nip pressure created by the opposed driving rollers on the handrail constantly adjusts itself responsive to changes in motion retarding frictional forces generated between the handrail and the handrail guide.

It is yet another object of this invention to provide a handrail drive of the character described wherein the drive rollers can be easily swung toward and away from each other to facilitate mounting and demounting of the driving rollers on the handrail.

It is another object of this invention to provide a handrail drive of the character described wherein there is substantially no nip pressure generated on the handrail when the handrail drive is in an idle condition, such as when the passenger conveyor is not moving.

These and other objects and advantages of the invention will become more readily apparent from the following detailed description of a preferred embodiment thereof when taken in conjunction with the accompanying drawings in which:

BEST MODE FOR CARRYING OUT THE INVENTION

Figures 1, 2:
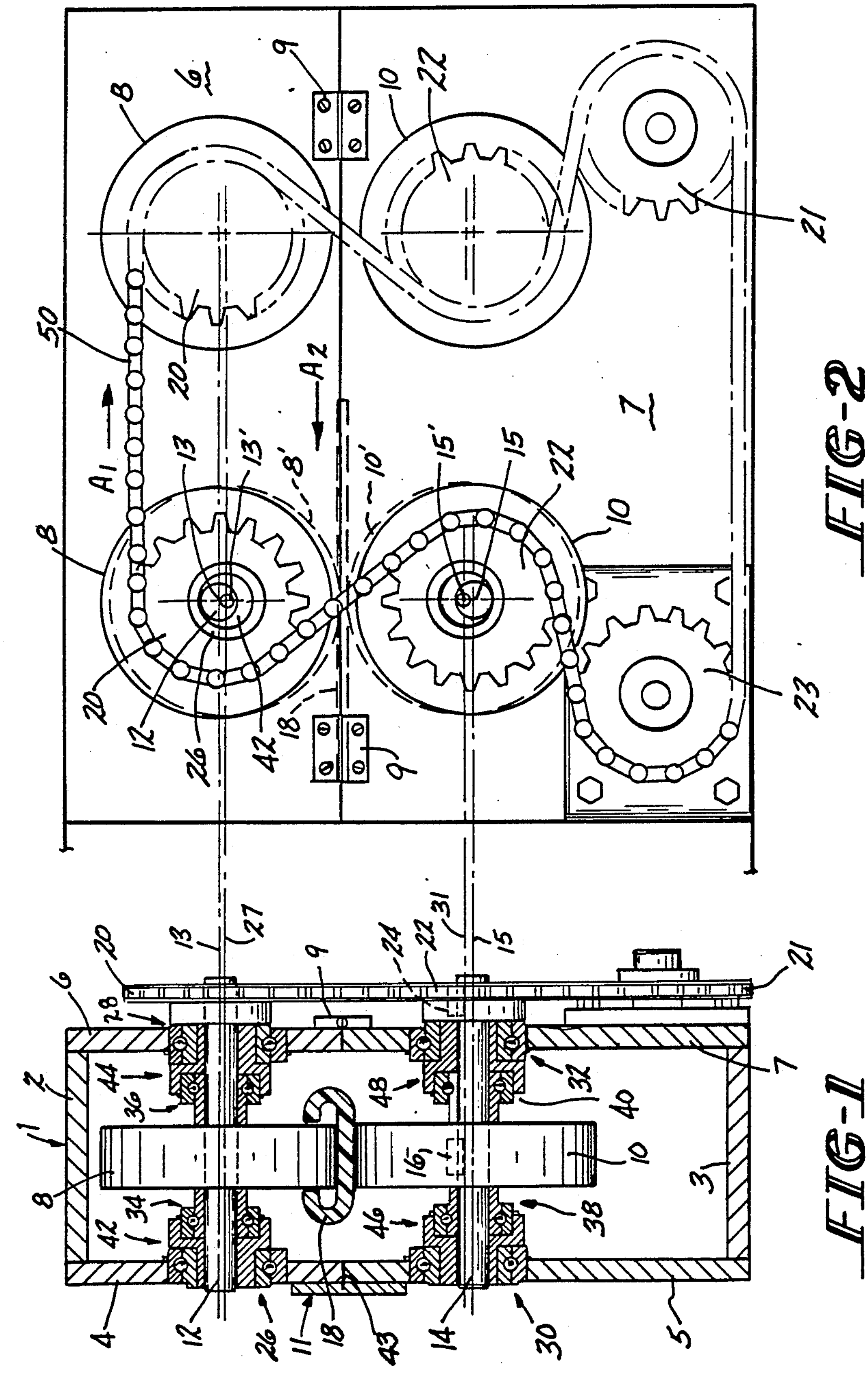
FIG. 1 is a sectional view of the mechanism showing the eccentricity of the roller and sprocket shafts, and the shaft mount bearings.
FIG. 2 is a somewhat schematic elevational view of the mechanism showing how the nip pressure is adjusted when the mechanism is driving the handrail, and showing the hinges on one side of the mechanism housing.

Referring now to FIG. 1, the housing for the drive mechanism is denoted by the numeral 1, and includes opposed upper side walls 4 and 6, a top wall 2, opposed lower side walls 5 and 7, and a bottom wall 3. Hinges 9 connect the side walls 6 and 7, and a locking plate 11 spans the joint 13 between the side walls 4 and 5 to releasably lock the two together. Driving rollers 8 and 10 are mounted on shafts 12 and 14, respectively, and are keyed to the shafts by keys 16 (only one of which is shown). The rollers 8 and 10 combine to form a nip through which the handrail 18 passes. Chain sprockets 20 and 22 are secured by keys 24 (only one of which is shown) to the shafts 12 and 14, respectively. The rollers 8, 10, respective shafts 12 and 14, and respective sprockets 20 and 22 thus rotate in concert. Bearings 26 and 28 are mounted in the housing walls 4 and 6, as are bearings 30 and 32. Shaft bearings 34, 36, 38 and 40 are mounted on the shafts 12 and 14, respectively. Bushing 42 interconnects bearings 26 and 34, and similarly bearings 44, 46 and 48 interconnect bushings 28 and 36; 30 and 38; and 32 and 40, respectively. As a result, the shafts 12 and 14 rotate in the bushings 42, 44, 46 and 48, respectively. Additionally, bushings 42, 44, 46 and 48 can rotate within the housing walls 4 and 6 by virtue of the bearings 26, 28, 30 and 32, respectively.

In FIG. 1, the mechanism is shown as it appears at rest, i.e., when the sprockets 20 and 22 are not moving and when the handrail 18 is not moving. The axis of the shaft 12 designated by the numeral 13, and the axis of the shaft 14 is designated by the numeral 15. The axes of the bearings 26, 28 and the bushings 42, 44 are designated by the numeral 27 while the axes of the bearings 30, 32 and the bushings 46, 48 are designated by the numeral 31. It will be noted that the axes 13 and 27 are offset, as are the axes 15 and 31, and that the axes 27 and 31 are closer together, and closer to the handrail 18 and nip than are the axes 13 and 15. The device is designed to provide only a very light compression of the handrail 18 by the rollers 8 and 10 when at rest as is shown in FIG. 1. It will be appreciated that the axes 13 and 15 are as far apart as they can be as shown in FIG. 1.

Referring to FIG. 2, it will be noted that the drive chain 50 is threaded about the sprockets 20 and 22, and also about power sprocket 21 and idler sprocket 23. The power sprocket 21 is driven by a power source, such as an electric motor (not shown). One of the links in the chain 50 will be removable to allow the chain 50 to be taken off of the sprockets. It will be noted that the chain 50 has some slack when the mechanism is at rest thus allowing the axes 13, 15, 27 and 31 to assume the positions shown in FIG. 1. When the mechanism is started up to drive the handrail 18 in the direction of the arrow $A_2$, the chain 50 will be driven in the direction $A_1$, by the power sprocket 21 thereby rotating the rollers 20 in the clockwise direction, and rotating the roller a in the counterclockwise direction. The position of the rollers 8, 10, sprockets 20, 22 and chain during driving of the handrail 18 are shown in phantom in FIG. 2. When the shafts 12 and 14 are rotated in this fashion, the bushings 42, 44, 46 and 48 will rotate in the bearings 26, 28, 30, and 32, respectively. This rotation causes the axes 13 and 15 to shift to the positions 13' and 15', shown in FIG. 2. In this manner, the centers of the rollers 8 and 10 are shifted, and thus the circumferences thereof are also shifted to the positions 8' and 10'. In the latter positions, the nip is tightened whereby nip pressure on the handrail 18 is increased. The drive rollers can be arranged in sets of pairs driven by a common chain, as shown in FIG. 2, or the roller pairs can be spaced further apart along the path of travel of the handrail. It will be readily apparent that the drive rollers will tighten onto the handrail no matter which direction the handrail is being moved.

Figure 3:
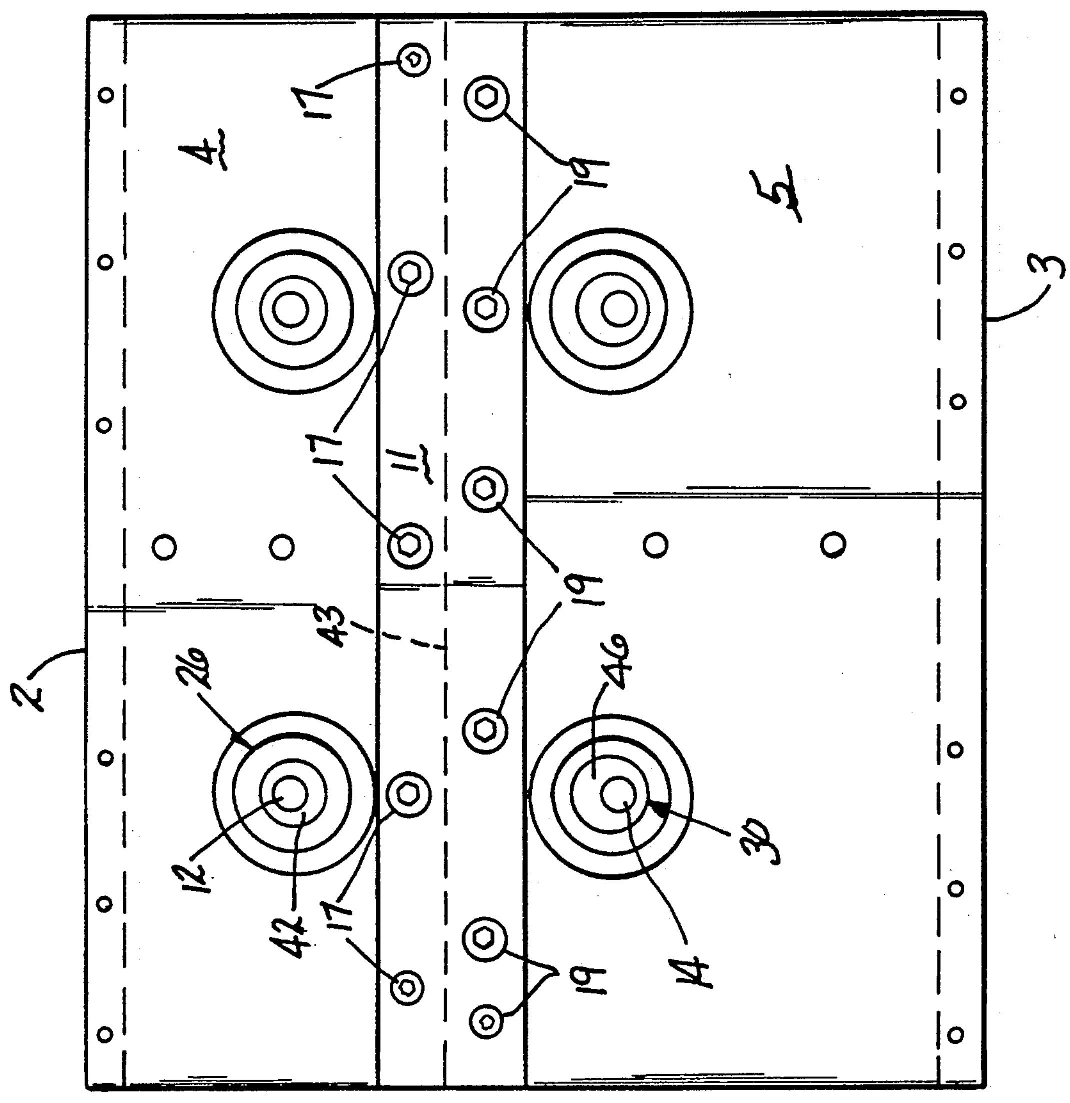
FIG. 3 is an elevational view of the other side of the housing showing the locking plate covering the joint between the two parts of the housing.

Referring now to FIG. 3 details of the locking plate 11 are shown. The plate 11 overlies the joint 43 between the side walls 4 and 5. Bolts 17 and 19 secure the plate 11 to the walls 4 and 5 respectively. In order to open up the mechanism, the chain will first be removed from the sprockets, and then the bolts 19 will be removed from the plate 11 and housing wall 5. The upper part of the housing can then be pivoted about the hinges 9 to move the rollers 8 upward and away from the handrail 18. The handrail 18 is thus freed from the nip so that servicing of the handrail, or the drive assembly can be facilitated easily. To ready the assembly for further operation, the housing top half is merely pivoted back, the rollers 8 properly oriented, and the bolts 19 are replaced.

Since many changes and variations of the disclosed embodiment of the invention may be made without departing from the inventive concept it is not intended to limit the invention otherwise than as required by the appended claims.

What is claimed is:

1. A handrail drive assembly for a moving handrail, said assembly comprising:

(a) first and second cooperating drive rollers mounted on rotatable drive roller shafts, said drive rollers forming a nip through which the handrail passes;

(b) rotatable end bearings supporting opposite ends of said drive roller shafts said end bearings being mounted eccentrically of said drive roller shafts;

(c) drive means for rotating said drive rollers and drive roller shafts in said end bearings whereby the axes of said drive rollers move toward each other due to the eccentricity of said shafts and bearings, to increase nip pressure on the handrail responsive to resistance to movement of the handrail;

(d) said drive rollers, shafts, bearings and drive means being mounted in a housing having two opposed component parts, one of said component parts carrying said first drive roller, its associated shaft, end bearings and drive means, and the other of said component parts carrying said second drive roller, its associated shaft, end bearings and drive means; and (e) hinge means for separating said opposed component housing parts whereby said nip can be opened to release the handrail from the drive rollers.

2. The handrail drive assembly of claim 1, wherein said drive means comprises roller sprockets mounted on each of said drive roller shafts and a chain entrained about said sprockets, and a powered sprocket for driving said chain and said roller sprockets.

3. The handrail drive assembly of claim 2, wherein said hinge means for separating includes hinges mounted on first adjacent roller sprocket side wall parts of said housing whereby said adjacent side wall parts can be pivoted relative to each other.

4. The handrail drive assembly of claim 3 further comprising releasable means for locking second adjacent housing side wall parts together to secure the housing during operation of the assembly.

* * * * *

UNITED STATES PATENT AND TRADEMARK OFFICE
CERTIFICATE OF CORRECTION

PATENT NO. : 4,998,613

DATED : March 12, 1991

INVENTOR(S) : James A. Rivera and Gerald E. Johnson

It is certified that error appears in the above-identified patent and that said Letters Patent is hereby corrected as shown below:

In Column 3, line 35, please delete the word "bear-" and insert the word --bush--- in lieu thereof.

In Column 3, line 36, please delete the word "bushings" and insert the word --bearings-- in lieu thereof.

In Column 4, line 3, please delete the words "roller a" and insert the words --rollers 8-- in lieu thereof.

Signed and Sealed this

Eighth Day of September, 1992

*Attest:*

DOUGLAS B. COMER

*Attesting Officer*

*Acting Commissioner of Patents and Trademarks*